(12) United States Patent
Gehlot

(10) Patent No.: US 6,310,542 B1
(45) Date of Patent: *Oct. 30, 2001

(54) COGNITIVE SYSTEM FOR A VEHICLE AND ITS OCCUPANTS

(75) Inventor: Narayan L. Gehlot, Sayreville, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,663

(22) Filed: Aug. 19, 1999

(51) Int. Cl.[7] .................................................. B60R 25/10
(52) U.S. Cl. ........................................ 340/426; 340/425.5
(58) Field of Search ................................ 340/425.5, 426, 340/438, 439, 539, 902, 903, 988, 10.2, 825.31; 307/10.2, 10.4, 10.6; 701/1, 36, 102

(56) References Cited

U.S. PATENT DOCUMENTS

| | | | |
|---|---|---|---|
| 4,303,904 | 12/1981 | Chasek | 235/384 |
| 4,829,434 | 5/1989 | Karmel et al. | 701/59 |
| 5,086,389 | 2/1992 | Hassett et al. | 705/13 |
| 5,357,438 | 10/1994 | Davidian | 340/436 |
| 5,432,509 | 7/1995 | Kajiwara | 340/903 |
| 5,465,079 | 11/1995 | Bouchard et al. | 340/576 |
| 5,485,520 | 1/1996 | Chaum et al. | 705/74 |
| 5,546,311 | 8/1996 | Sekine | 340/902 |
| 5,570,087 | 10/1996 | Lemelson | 340/439 |
| 5,574,641 | 11/1996 | Kawakami et al. | 701/1 |
| 5,663,548 | 9/1997 | Hayashi et al. | 235/384 |
| 5,694,116 | 12/1997 | Kojima | 340/576 |
| 5,709,281 | 1/1998 | Sherwin et al. | 180/272 |
| 5,717,606 | 2/1998 | Hara et al. | 340/439 |
| 5,745,031 | 4/1998 | Yamamoto | 340/439 |
| 5,815,070 | 9/1998 | Yoshikawa | 340/439 |
| 5,819,234 | 10/1998 | Slavin et al. | 705/13 |
| 5,821,860 | 10/1998 | Yokoyama et al. | 340/576 |
| 5,847,661 | 12/1998 | Ricci | 340/902 |
| 5,874,892 | 2/1999 | Antonellis et al. | 340/438 |
| 5,878,156 | 3/1999 | Okumura | 340/575 |

OTHER PUBLICATIONS

Web page designed by D–Zone Studios, found at http://www.ezpass.com/html/howit.html, entitled "How Does E–Z Pass Work?", pp. 1–3, dated Aug. 9, 1999.

*Primary Examiner*—Van T. Trieu
(74) *Attorney, Agent, or Firm*—Stroock & Stroock & Lavan LLP

(57) ABSTRACT

The present invention relates to a system for receiving, processing, and storing real-time data from various types of input, including but not limited to information from a vehicle's micro-processing systems, a driver information card, a vehicle information card, and physical attributes of the driver/owner. The system generally includes a processor mounted or otherwise installed in a vehicle which is capable of receiving data from the vehicle's various mechanical and electrical/electronic system, micro-processing systems, information cards, and physical inputs. The data can be used to grant a driver authorization to operate the vehicle and can be transmitted to third parties having an interest in the data such a system can accumulate.

29 Claims, 4 Drawing Sheets

COGNITIVE SYSTEM FOR A VEHICLE AND ITS OCCUPANTS

FIELD OF THE INVENTION

This invention relates to a system for collecting vehicle data and preventing unauthorized vehicle use, and, in particular, a system for collecting data from various vehicle systems, information cards, and other external data sources and transmitting the collected data to external data receivers.

BACKGROUND OF THE INVENTION

Over four thousand micro-processors currently operate the systems of a modem vehicle. Such micro-processors are currently used to control important vehicle systems, such as the ignition system, the fuel mixture and flow, the transmission system, and anti-lock braking systems. Each system is prone to malfunction, which may result in poor performance or complete breakdown of the vehicle. Upon such a malfunction, repair shops must subject the vehicle's systems to a series of diagnostic tests to locate the problematic system, thereby increasing the cost of repairs and maintenance on a vehicle.

In addition, car manufacturers spend a great deal of time and money researching and testing such systems and may not learn of poorly designed systems for many years. This delay decreases the ability of car manufacturers to quickly and efficiently replace poorly designed systems and, eventually, leads to increased costs to consumers. Moreover, car manufacturers would benefit from information, on a real-time basis, relating to how their vehicles are being driven, how their vehicles are performing with respect to, for example, gas mileage, brakes, accidents, parts replacements, etc. In addition, consumers can get first-hand, up to the minute information regarding vehicle performance before they purchase the vehicle. Such information allows manufacturers to design better, more efficient vehicles for realistic driving styles.

Furthermore, vehicle thefts cost consumers about seven billion dollars a year in insurance and replacement costs. In 1996, more than 1.3 million vehicles were stolen. Moreover, in New York City approximately one in every 48 vehicles was stolen in 1996. Vehicle thefts, such as car jacking, put people in physical danger and often result in tragedy. Presently, passive and active car alarms can be easily disabled by professional car thieves. More sophisticated systems, such as LO-JACK™, do aid law enforcement authorities in tracking down thieves. LO-JACK™, however, cannot prevent vehicle theft at its inception in that it does not disable the vehicle. In addition, there may be a time lapse between reporting the theft to the police, activating LO-JACK™, and reclaiming the vehicle. By the time the police locate the vehicle, it may be too late in that the vehicle may be dismantled in a "chop-shop."

Thus, there is a need for a system that provides real-time data regarding the operation of a vehicle's systems and driving patterns. In addition, there is a need for a system that prevents unauthorized persons from driving a vehicle or decreases the incentive to steal the vehicle.

SUMMARY OF THE INVENTION

The present invention relates to a system for receiving, processing, and storing real-time data from various types of input, including but not limited to information from a vehicle's micro-processing systems, a driver information card, a vehicle information card, and physical attributes of the driver/owner.

The vehicle data system (hereinafter referred to as the "Vehicle Data System" or "VDS") generally includes a processor mounted or otherwise installed in a vehicle. The processor (hereinafter referred to as the "Vehicle Data Processor" or "VDP") is capable of receiving data from the vehicle's various mechanical and electrical/electronic system, micro-processing systems, information cards, and physical inputs. The data received can be processed and output to external entities and devices. In addition, the VDP controls the vehicle's ignition systems and can prevent unauthorized persons from starting the vehicle. The VDS is preferably equipped with a transmitting device capable of alerting law enforcement authorities of possible theft or tampering with the system. The VDS may be provided with a Global Positioning Satellite (GPS) unit giving law enforcement authorities the ability to track the vehicle.

In a preferred embodiment, the user is prompted by the VDS to input some form of physical data, i.e. retinal scan, fingerprint, voice recognition, and to insert a driver and/or vehicle information card into a card reader/writer that is designed to work in conjunction with the VDP. The VDP matches the data to information stored in memory and grants authorization to the user. This method alleviates the problems associated with, for example, lost or misplaced keys. If the data does not create a match, the VDS will not permit the user to drive the vehicle. During the trip, the VDS constantly monitors the vehicle's systems and provides data regarding the operation of such systems. This data can be transmitted to law enforcement authorities, or transmitted or sold to repair shops, car manufacturers, or other third parties having an interest in the data such a system can accumulate.

If, at any time, the VDS is tampered with or disabled, the VDS is provided with a radio transmitter or a transponder, used to alert law enforcement authorities of such tampering. In this way, the present invention prevents a potential thief from by-passing the VDS.

It is envisioned that the system of the present invention would be desirable to many different entities, such as, for example, car manufacturers, repair shops, law enforcement authorities, environmental monitoring companies, Division of Motor Vehicles (DMV), and insurance companies, to name a few. The present invention will decrease vehicle thefts as well as any unauthorized use, thereby lowering insurance costs. The present invention will also provide car manufacturers with valuable data about their vehicles, which may result in more efficient and reliable vehicles.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the figures, which are not to scale, and which are merely illustrative, and wherein like reference numerals depict like elements throughout several views.

DETAILED DESCRIPTION OF THE PREFERRED EMBODIMENTS

Figure 1:
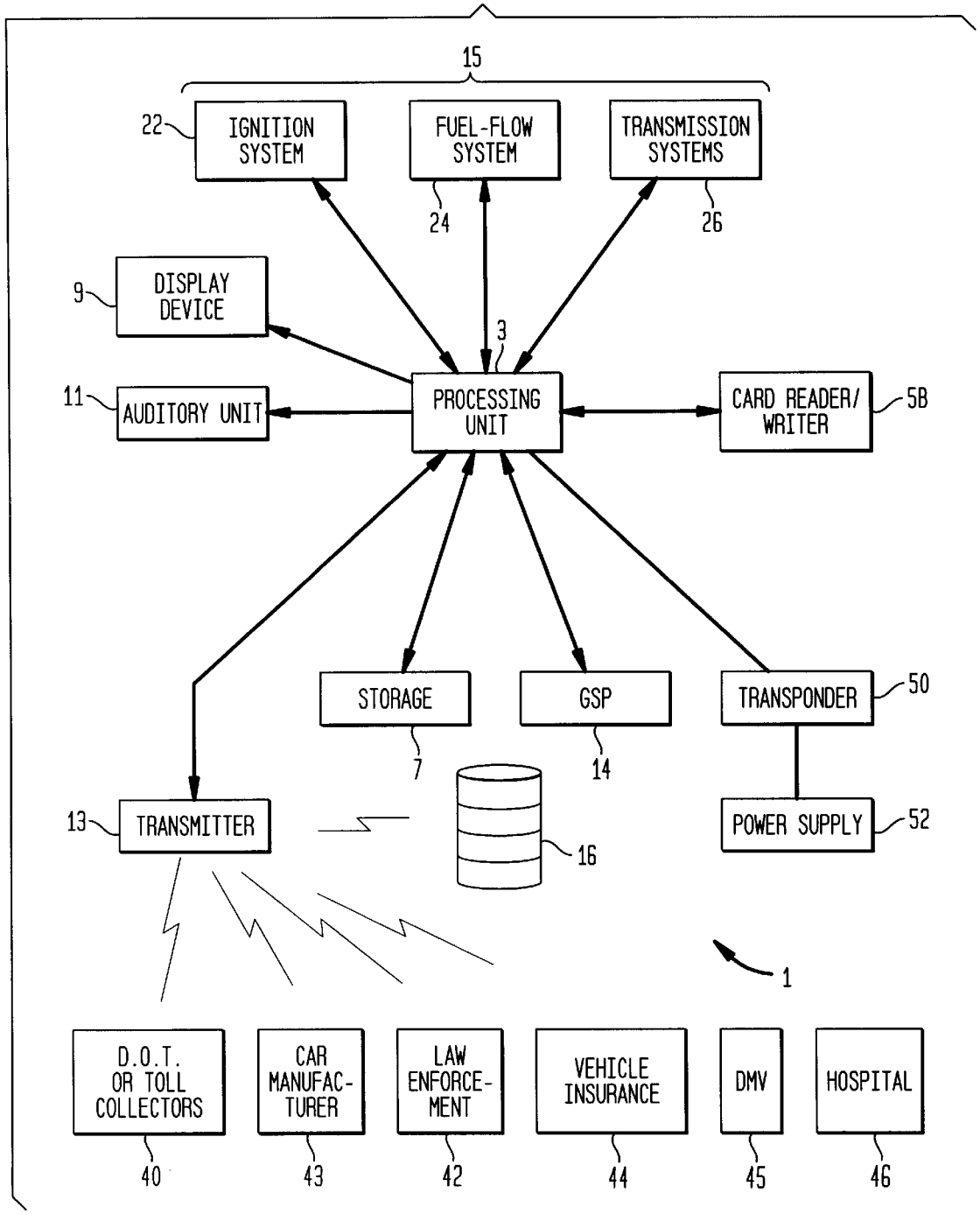
FIG. 1 is a system diagram of the Vehicle Data System of the present invention.

With reference to FIGS. 1 to 4, the present invention, the vehicle data system ("VDS") 1, comprises a vehicle data processing unit ("VDP") 3 for communicating and collecting data from various vehicle systems 15 and physical input devices 5, e.g., a microphone 5A for voice recognition, a card reader/writer 5B, and a scanner 5C such as a hand or retinal scanner. Further, vehicle data system 1 is provided with an electronic data storage unit 7 for storing the collected data. In one embodiment of the present invention, the vehicle data system collects vehicle data and writes the collected data onto removable information cards 28–34, as will be discussed shortly. In another embodiment, the vehicle data system compares newly entered physical data to physical data previously stored onto data storage unit 7, and allows the driver to drive the automobile if access is authorized. The vehicle data system 1 also provides the function of displaying relevant information to a display unit such as visual display unit 9 and auditory display unit 11 for communicating with a driver. Information such as, for example, the status of the various vehicle systems 15 can be displayed. In addition, information as to whether access to the automobile is authorized may be displayed. The vehicle data system 1 then sends the collected data to a card reader/writer 5B. The present invention also includes a transmitter device 13 for communicating with external entities and devices. As used herein, the term vehicle is intended to include any means to transport people or things, such as any type of passenger car, van or sport utility vehicle, boats, planes, race cars, and any type of commercial or non-commercial vehicle presently or hereinafter known. Furthermore, as used herein, the term vehicle systems 15 is intended to refer to those systems within a vehicle that are mechanical, or electrical, or those that may be controlled by a micro-processor of a type known in the art, such as, by way of non-limiting example, ignition systems 22, fuel flow and mixture systems 24, and transmission systems 26, to name a few.

Referring now to FIG. 1, there is shown a system for the collection of vehicle data and the storage of the collected data. This system includes a processing unit 3, input-output devices 5, vehicle systems 15, display devices 9 and 11, a storage device 7, and a transmitter 13. The processing unit 3 may be, for example, a software or firmware controlled processor or any other comparable type of unit for sending, retrieving and analyzing data, and controlling devices within the vehicle to initiate pre-programmed responses as a result of the analyzed data, such as, for example, a programmable microprocessor, microcomputer, minicomputer, a PLC-type controller, Application-Specific Integrated Circuit (ASIC) or the like.

Figure 2:
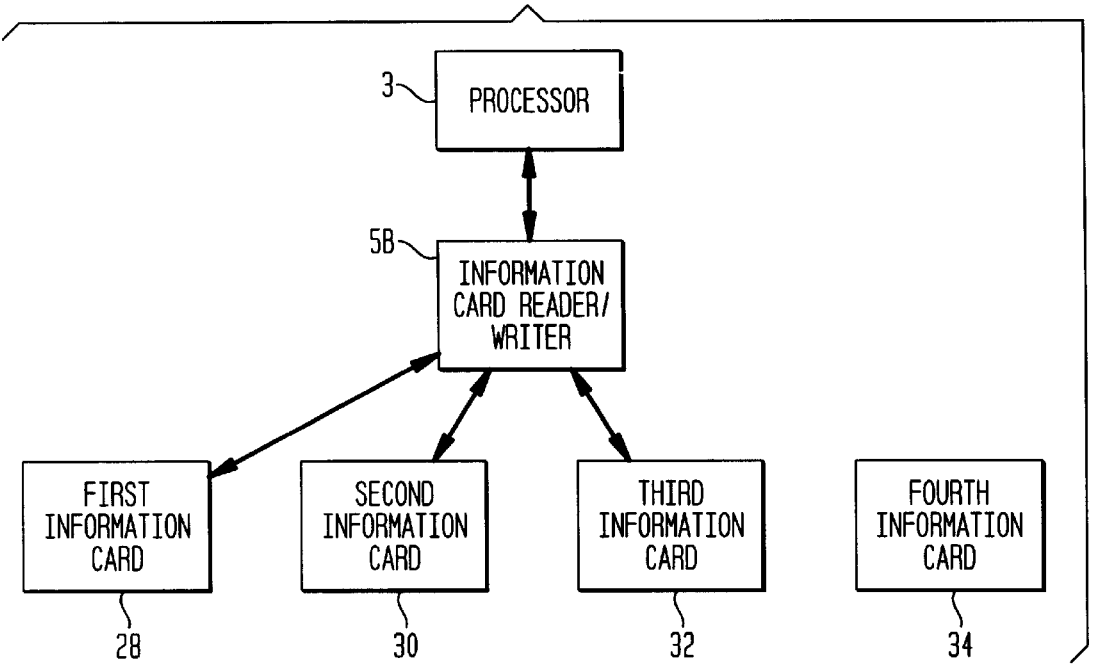
FIG. 2 is a system diagram of the Information Storage Device Reader/Writer.

Referring to FIG. 2, one of the input-output devices 5 from FIG. 1 is depicted. In particular, there is shown an Information Card Reader/Writer ("card reader") 5B. The card reader 5B is in communication with the processing unit 3. The processing unit 3 may receive data from input devices such as the card reader 5B. In one embodiment of the invention, the card reader may read information from one or a plurality of information cards, such as a first information card 28, a second information card 30, a third information card 32, and a fourth information card 34. Information cards 28, 30, 32, and 34 can be one of several types, such as, for example, Erasable Programmable Read-Only Memory (EPROM), bonded cards, bar-coded cards, magnetic strip cards, Single In-Line Memory Module (SIMM), smart cards, etc. The first information card 28 can include information related to the driver of the vehicle. Such information may include, but is not limited to, information generally found on a state-issued driver's license, driving records, medical information, family/relatives information, and insurance information. The second information card 30 can include information related to the vehicle itself. For example, the second information card may include, but is not limited to, the VIN, vehicle registration information, vehicle inspection information, vehicle repair histories, and the like. The third information card 32 can serve as a debit card to pay for highway, bridge and tunnel tolls, park entrance fees, and the like. The fourth information card 34 can serve as a passenger card to keep track of which passengers may be present in the automobile at any given time, or contain other information such as whether there are children in the vehicle, the driver's and passengers' blood-types, emergency contact information, and the like. One skilled in the art will realize, however, that any number of information cards containing information of any type, may be utilized with the present invention.

The driver of the automobile (and any passengers of the vehicle who may have fourth information cards 34) would then have to download information from the information cards 28–34 to the card reader 5B. The downloading of the information can take one of several contact and non-contact forms, such as, for example, optical, electrical, magnetic, and acoustic. For example, the driver may swipe a card with a magnetic strip through a card reader 5B, insert a smart card into the card reader 5B, or the like. Once the information from one or more of the information cards 28, 30, 32 and 34 has been inputted, the processing unit 3 can retrieve the downloaded information from the information card reader 5B.

Referring again to FIG. 1, the processing unit 3 is capable of retrieving vehicle data from the vehicle systems. In particular, the processing unit 3 may retrieve malfunction information such as that related to the ignition system 22, the fuel mixture and fuel flow system 24, the transmission 26, the anti-lock braking system, and the like. In addition, vehicle data such as average, maximum and minimum speeds driven, average fuel consumption, distance traveled, and the like may be retrieved from the vehicle systems and calculated by the processing unit 3 and this information may be displayed on a visual display unit 9 or an auditory unit 11.

Once the processing unit receives the collected data, this information can be stored in data storage device 7. Data storage device 7 may be, for example, a hard disk of the type known in the art or any other device capable of storing data for use by the processing unit 3.

In a preferred embodiment, the retrieved vehicle data would correspond to both the individual driver based on the information received from the first information card 28 and to a specific vehicle based on the information from the second information card 30.

Once the collected data is stored onto the data storage device 7, it is capable of being accessed by the processing unit 3 in order to display the collected data to the driver. The collected data can be displayed on a visual display device 9, an auditory display device 11, or both.

In addition, the collected data which is stored on the data storage device 7 can be outputted to the information cards 28–34 via the input-output device 5 such as the card reader/writer 5B. Such outputted information may include automobile diagnostics, driver's driving history, etc. Since the information cards 28–34 are easily removable from the card reader/writer 5B, the information contained on the information cards 28–34 can be easily transferred to many third-parties such as, for example, a central database 16, the Department of Transportation (DOT) 40, law enforcement 42, vehicle manufacturers 43, insurance companies 44, Division of Motor Vehicles (DMV) 45, and hospitals 46, to name a few. Insurance companies would benefit from receiving the outputted information in that they would receive information not normally reported to insurance companies by drivers. For example, information such as running red lights and stop signs, vehicle self-repairs, speeding, etc. In addition, the DMV would benefit by saving time, money, and effort by requiring that only vehicles which need to be inspected are inspected. For example, if the collected information relating to the brakes and the exhaust of the vehicle is satisfactory with the DMV, then the DMV may not need to inspect the vehicle.

Furthermore, in case of an accident, the VDS may prompt the driver to speak or respond in order to determine if the driver is okay. If the driver does not respond, the VDS can automatically alert the proper authorities, call the nearest hospital, provide vehicle location, provide medical records, etc.

Figure 3A:
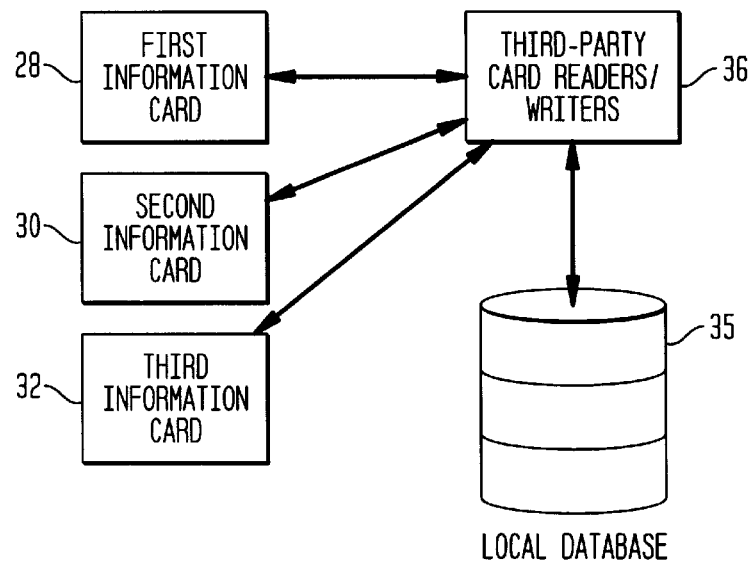
FIG. 3A is a system diagram of a Third-Party Card Reader.

Referring now to FIG. 3, there is shown a third-party card reader/writer 36 that may receive the input of information cards 28–34. In addition, the third-party card reader/writer 36 may write relevant information onto the information cards 28–34 such as, for example, the date for the next oil change or the DMV may update the driver's driving record, etc. Information received by the third-party card reader/writer 36 can be downloaded to a local database 35.

Referring once again to FIG. 1, information stored onto the data storage device 7 may also be transmitted to the external entities and devices such as those mentioned in the previous paragraph, via wireless transmission. In particular, the transmitter 13 can be used to transmit information via, or example, a radio frequency (RF) transmitter or via an infrared radiation (IR) transmitter. One skilled in the art will recognize from the teachings herein that the information may be transferred to many external entities and devices using any number of types of known data transmission techniques, such as, for example, cellular telephones, wireless modems, or the like.

In the preferred embodiment, the collected data is transmitted to data collection units 60 which may be located, for example, along the highway. The data collection units 60 may include, for example, a sensor/receiver 62, a processor 64, a transceiver 66, and data storage unit 68. The processor 64 can be programmed so that the collected data can be to automatically transmitted from the transceiver 66 in the data collection units 60 to certain external entities, such as, for example, vehicle manufacturers 43, DMV 45, hospitals 46, and others just discussed above.

Figure 3B:
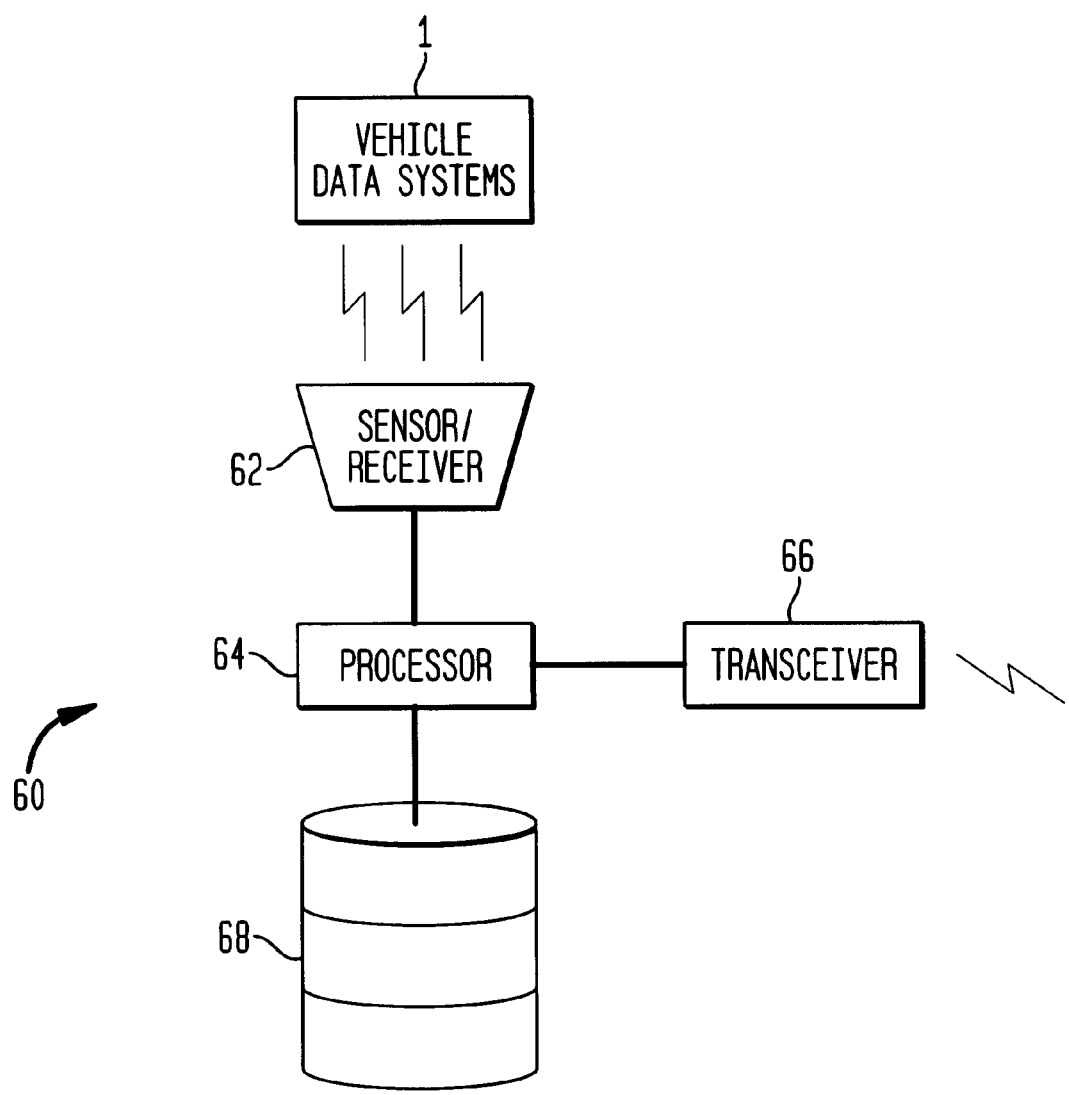
FIG. 3B is a system diagram of a Data Collection Unit.

For example, an automobile dealer may want data collected from certain makes of automobiles, at certain times, and/or from certain highways. Accordingly, the automobile dealers may set up data collection units 60 to collect the selected data and transmit the data to them automatically on a real-time basis. It should be noted that the collected data may also be retrieved by the external entities by accessing the transceiver 66 and local database 68 such as that in communication with the processor 64 as shown in FIG. 3B. In such a case, the external entities, such as automobile dealers, may not receive the collected data in real-time.

Figure 4:
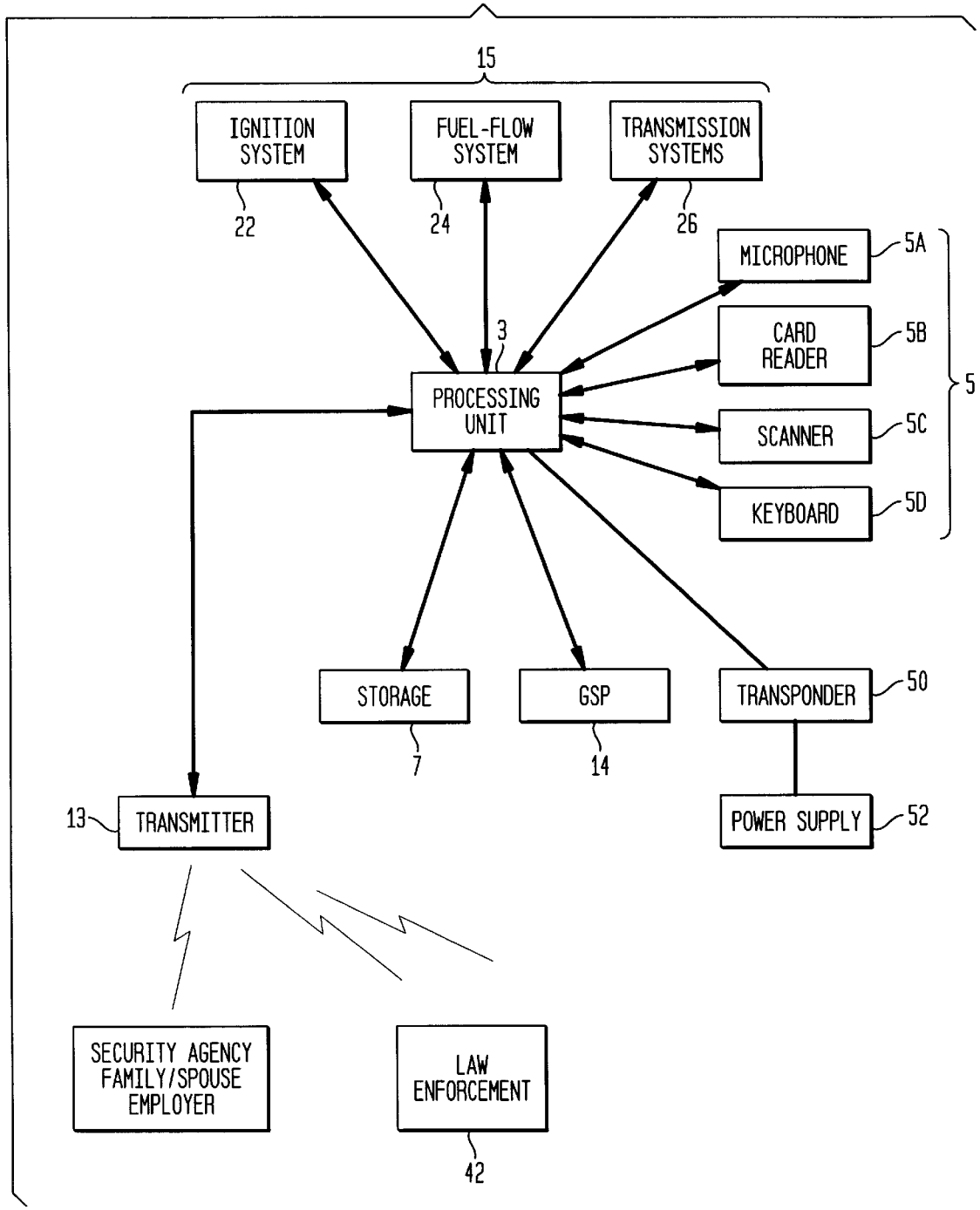
FIG. 4 is a system diagram of a unit used to deter the unauthorized use of a vehicle.

Referring now to FIG. 4, there is shown another embodiment of the present invention where the system is to deter the unauthorized use of a vehicle and prevent theft of the same. In particular, a driver/owner of a vehicle will first set-up the system by storing the driver's physical data onto the data storage device 7. Such physical data may include the entry of a password via a keyboard, a driver's voice, a driver's retinal scan, a driver's hand-print, or the like. The physical data may be retrieved from the driver/owner by the use of a keyboard, a microphone, a retinal scanner or a hand-scanner. The retrieved physical data may be stored onto the data storage device 7.

Referring to FIG. 2, upon entering the vehicle, the driver must download information from the first and second information cards 28, 30. As previously discussed, this may be accomplished, for example, by swiping the information cards 28, 30 through the card reader 5B or by any other types of contact and non-contact methods of downloading information. This information is then transmitted to the processing unit 3. Once the information from the information cards has been transmitted to the processing unit 3, the processing unit 3 then requests the input of information from the driver. By use of the display devices 9 and 11, the processing unit 3 may, for example, prompt the driver to recite a pre-determined phrase into a microphone 5A. With the use of voice recognition software known in the art, the processor compares the newly entered voice to that which is stored on the data storage device 7 by analyzing the voice patterns. Of course, the processing unit 3 can also request the driver to provide the input of a hand-print using a scanner 5C, which may be a hand-scanner, or a retinal scan using a retinal scanner, and compare these inputs in a manner similar to the voice comparison discussed above.

The processing unit 3 determines whether the driver is authorized to operate the vehicle. If the driver is not authorized to operate the vehicle, the processing unit 3 initiates a safety mode. The safety mode essentially disables the vehicle. In order to disable the vehicle, the processing unit, which is in communication with several, if not all, of the vehicle systems, transmits a control signal to certain vehicle systems. For example, a control signal sent to the unit controlling the fuel-flow system 24 may prevent any fuel from entering the engine of the vehicle. Another example may be where a control signal is sent to the unit that controls the ignition system 22 thereby disallowing the starting of the vehicle. One skilled in the art will realize that there are many methods to temporarily disable the vehicle. Upon the disablement of the vehicle, a transmitter 13 would alert the local authorities that there is an unauthorized use in progress by transmitting an alert signal.

In addition, the system preferably includes a Global Positioning Satellite (GPS) unit 14. GPS data from the GPS unit can also be routed by the processor unit 3 to transmitter 13 to be sent to law enforcement as part of the alert signal. This will allow the local authorities to quickly locate the vehicle. The use and operation of GPS systems are well-known in the art and, therefore, these systems require no further discussion.

If the driver is authorized to operate the automobile, the driver may choose to modify the vehicle settings. For example, the driver/owner of the vehicle may choose to add or remove family members or friends from the list of drivers eligible to operate the vehicle. This feature is particularly useful for rental car businesses, which could grant access only to their rental customers and have access to real-time information regarding their customers' usage and driving patterns such as miles driven, amount of gas in tank, if driver was speeding, time engine was shut-off, etc. In addition, the rental business can be provided with information as to the exact minute the vehicle was in the customer's possession and the exact minute it was dropped-off to the rental office. Each time a new customer rents the vehicle, the driver information could be updated by the rental company. This alleviates the problems associated with unauthorized friends and relatives operating the rental vehicle.

It is preferred, with reference to both of the embodiments of the present invention discussed above, that the processor 3 is mounted in such a position in the vehicle so that it is not visible and cannot easily be accessed by the driver or any person in the vehicle. The purpose of placing the processor 3 in such a manner is to deter anyone from tampering with the processor 3 in an unauthorized manner. Unauthorized tampering may include, for example, a person trying to power-down the system, reprogram the processor, physically damage the system, or the like.

As an additional safeguard, to deter or prevent the unauthorized tampering with the processor 3 or any other system component, it is preferred that the present invention automatically transmit a warning signal upon such tampering. Such a signal may be transmitted directly to a predetermined local authority, a security agency, the police, or the like.

In particular, the transmission of the tamper warning signal may preferably be sent by using the transmitter 13, previously discussed above. For example, if someone were to tamper with the data storage device 7 by attempting to store new information or delete existing information, a tamper signal could be sent to the processor 3 which would then send a tamper warning signal to the transmitter 13, which would ultimately transmit a tamper warning signal to the police.

Alternatively, a transponder 50, which is an art-recognized transceiver in that it contains both a transmitter and receiver, may be used to automatically transmit a signal when a predetermined "trigger" is received by the transponder 50. The "trigger," which in an art-recognized manner is often in the form of a pulse, can be sent by the processor 3 upon the unauthorized tampering as discussed above. Other system components may also be set-up to send a "trigger" to the transponder 50 directly upon the tampering of each such component. This may be accomplished using some type of wireless communication known in the art.

The transponder 50 can be a separate unit not attached to the transmitter 13 previously discussed. In this manner, it can have a separate power supply 52. A separate power supply has the advantage that it will not power-down if the power supply driving the VDS powers-down. Furthermore, a separate unit allows for additional ease in hiding the transponder 50.

In addition, the driver, while in the vehicle, may also choose to activate the transponder which will contact the police and have the vehicle tracked in a situation where the vehicle is hi-jacked. This may be accomplished by having a panic button 53 which is in communication with the processing unit 3, in communication directly with the transponder 50, or both. The panic button 53 may be placed in a position easily accessible to the driver. If the panic button 53 is directly in communication with the processing unit 3, pressing the panic button 53 will cause a warning signal to be sent to the police, or the like, via the transmitter 13. In addition, since the processing unit can also control the vehicle systems, pressing the panic button can also disable the vehicle within a reasonable distance so that the system 1 has sufficient time to alert the police or the authorities of the hijack in progress. In addition, a driver may want to stop the vehicle as soon as possible without having the vehicle travel a reasonable distance. In such a case, the driver would have to, for example, press the panic button twice. The processor 3 would be programmed to stop the car as soon as possible upon receipt of such an instruction.

This feature will assist in ensuring the authenticity of the data in that a warning signal will be sent if anyone attempts to manipulate or delete any of the data contained in the processor 3 or the data storage device 7. Furthermore, this will aid in preventing any override of the VDS system in that a warning signal will be transmitted upon any attempts to override the system. Also, the use of the panic button 53 in conjunction with the VDS 1 will aid in reducing or preventing hijackings.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A system for storing, retrieving and transmitting of vehicle data comprising:
    an information card reader/writer device mounted in a vehicle for reading input data from a magnetic strip-like information card and writing output information to a magnetic strip-like information card;
    a processor mounted in said vehicle and in communication with said information card reader/writer and a plurality of vehicle systems, said processor capable of retrieving said input data from said information card reader/writer device, sending output data to said reader/writer device for storage on a magnetic strip-like information card, and retrieving vehicle data from one or more of said plurality of vehicle systems, said processor transmitting said retrieved vehicle data in real-time to said card reader/writer for storage on a magnetic strip-like information card; and
    a transmitter for real-time transmission of said input data and/or said vehicle data using wireless transmission to external entities and devices.

2. A system according to claim 1 wherein said system further comprises a data storage device connected to said processor and capable of storing said retrieved vehicle data and said input data.

3. A system according to claim 1 wherein said system further comprises a display device capable of displaying said retrieved vehicle data and said input data to a driver of said vehicle.

4. A system according to claim 1 wherein said system further comprises a transmitter for real-time transmission of a signal upon the unauthorized tampering with said system.

5. A system according to claim 1 wherein information stored on said information card comprises a drivers name and address.

6. A system according to claim 1 wherein information stored on said information card comprises a driver's driver license identification number and information identifying a state that issued a driver license to said driver.

7. A system according to claim 1 wherein information stored on said information card comprises a driver's medical and dental history information and emergency contacts information.

8. A system according to claim 1 wherein information stored on said information card comprises a vehicle license number and vehicle identification number.

9. A system according to claim 1 wherein information stored on said information card comprises a vehicle make and model identification.

10. A system according to claim 1 wherein information stored on said information card comprises vehicle maintenance and repair history information and vehicle performance information.

11. A system according to claim 1 wherein information stored on said information card comprises account balance information.

12. A system according to claim 1 wherein information stored on said information card comprises a vehicle passenger's name and address.

13. A system according to claim 1 wherein information stored on said information card comprises a vehicle passenger's medical and dental history information and emergency contacts information.

14. A system for real-time retrieving and transmitting of vehicle and/or driver data comprising:

an information card reader/writer device mounted in a vehicle for reading input data from a magnetic strip-like information card and writing output information to a magnetic strip-like information card;

a processor mounted in said vehicle and in communication with said information card reader/writer and a plurality of vehicle systems, said processor capable of retrieving said input data from said information card reader/writer device, sending output data to said reader/writer device for storage on a magnetic strip-like information card, and retrieving vehicle data from one or more of said plurality of vehicle systems, said processor transmitting said retrieved vehicle data in real-time to said card reader/writer for storage on a magnetic strip-like information card; and a transmitter in communication with said processor, said transmitter automatically transmitting in real-time said retrieved vehicle data and/or said input data to data collection units deployed along a roadway and in wireless communication with said transmitter; and said data collection units further capable of being accessed by selected third-party entities so that said third-party can retrieve said vehicle and/or input data in real-time.

15. A system according to claim 14 wherein said system further comprises a data storage device connected to said processor and capable of storing said retrieved vehicle data and said input data.

16. A system according to claim 14 wherein said system further comprises a display device capable of displaying said retrieved vehicle data and said input data to a driver of said vehicle.

17. A system according to claim 14 wherein said data collection units further include a data storage device connected to said processor and capable of storing said retrieved vehicle data and said input data.

18. A system according to claim 14 wherein information stored on said information card comprises a driver's name and address.

19. A system according to claim 14 wherein information stored on said information card comprises a driver's driver license identification number and information identifying a state that issued a driver license to said driver.

20. A system according to claim 14 wherein information stored on said information card comprises a driver's medical dental history information and emergency contacts information.

21. A system according to claim 14 wherein information stored on said information card comprises a vehicle license number and vehicle identification number.

22. A system according to claim 14 wherein information stored on said information card comprises a vehicle make and model identification.

23. A system according to claim 14 wherein information stored on said information card comprises vehicle maintenance and repair history information and vehicle performance information.

24. A system according to claim 14 wherein information stored on said information card comprises account balance information.

25. A system according to claim 14 wherein information stored on said information card comprises a vehicle passenger's name and address.

26. A system according to claim 14 wherein information stored on said information card comprises a vehicle passenger's medical and dental history information and emergency contacts information.

27. A system for preventing unauthorized access to a vehicle comprising:

an input device for receiving driver data regarding the physical attributes and/or biological data about a potential driver of said vehicle;

an information card reader/writer device mounted in a vehicle receiving input data from a magnetic strip-like information card;

a processor mounted in said vehicle and in communication with said input device and said card reader/writer and a plurality of vehicle systems, said processor receiving said driver data from said input device and said input data from said information card reader/writer device, and assessing said driver data and input data to determine whether said potential driver is an authorized driver of said vehicle;

said processor enabling or disabling the operation of said vehicle based on said assessment.

28. The system of claim 27, wherein said physical and/or biological data comprises a retinal scan, fingerprint, handprint, voice, or password, or the like.

29. The system of claim 27, wherein said input device comprises a device for reading a retinal scan, a fingerprint, a handprint, voice recognition, or a typed password, or the like.

* * * * *